(12) United States Patent
Larson et al.

(10) Patent No.: US 10,923,105 B2
(45) Date of Patent: Feb. 16, 2021

(54) CONVERSION OF TEXT-TO-SPEECH PRONUNCIATION OUTPUTS TO HYPERARTICULATED VOWELS

(71) Applicant: Microsoft Technology Licensing, LLC, Redmond, WA (US)

(72) Inventors: Kevin Chad Larson, Seattle, WA (US); Tanya Matskewich, Redmond, WA (US); Gregory Carl Hitchcock, Woodinville, WA (US); Michael Tholfsen, Newcastle, WA (US); Guillaume Simonnet, Bellevue, WA (US); Viktoryia Akulich, Seattle, WA (US); Nicholas Kibre, Redwood City, CA (US); Christina Chen Campbell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 16/204,270

(22) Filed: Nov. 29, 2018

(65) Prior Publication Data

US 2020/0118542 A1 Apr. 16, 2020

Related U.S. Application Data

(60) Provisional application No. 62/745,437, filed on Oct. 14, 2018.

(51) Int. Cl.
*G10L 13/10* (2013.01)
*G10L 13/06* (2013.01)
(Continued)

(52) U.S. Cl.
CPC ............. *G10L 13/10* (2013.01); *G09B 19/04* (2013.01); *G09B 19/06* (2013.01); *G10L 13/06* (2013.01); *G10L 13/086* (2013.01)

(58) Field of Classification Search
CPC ....................................................... G09B 19/06
See application file for complete search history.

(56) References Cited

U.S. PATENT DOCUMENTS 4,007,548 A * 2/1977 Cytanovich ............ G09B 17/00
434/178
10,114,809 B2 * 10/2018 Wu ........................ G06F 40/169
(Continued)

FOREIGN PATENT DOCUMENTS

WO 2017082447 A1 5/2017

OTHER PUBLICATIONS

Ozturk, et al., "Phonetic Labeling and Stress Assignment for Turkish TTS", In Proceedings of the IEEE 12th Signal Processing and Communications Applications Conference, Apr. 30, 2004, pp. 463-465.
(Continued)

*Primary Examiner* — Douglas Godbold

(57) ABSTRACT

In non-limiting examples of the present disclosure, systems, methods and devices for mapping hyperarticulated sounds to text units are presented. A plurality of textual units may be received. The plurality of textual units may be processed with a natural language processing engine. A sentence structure for the plurality of textual units may be identified, wherein the sentence structure comprises a plurality of words. The plurality of words may be processed with a text-to-speech engine. A text-to-speech output comprising a plurality of pronunciations may be identified, wherein each of the plurality of pronunciations corresponds to a syllabic unit of one of the plurality of words. A hyperarticulated vowel sound may be mapped to each syllabic unit from the text-to-speech output. A pronunciation instruction corresponding to each hyperarticulated vowel sound may be caused to be surfaced.

18 Claims, 9 Drawing Sheets

(51) Int. Cl.
*G09B 19/04* (2006.01)
*G09B 19/06* (2006.01)
*G10L 13/08* (2013.01)

(56) References Cited

U.S. PATENT DOCUMENTS

| | | | | |
|---|---|---|---|---|
| 2005/0102143 A1* | 5/2005 | Woodward | G09B 19/08 | 704/254 |
| 2005/0137872 A1* | 6/2005 | Brady | G10L 13/033 | 704/269 |
| 2005/0182629 A1* | 8/2005 | Coorman | G10L 13/07 | 704/266 |
| 2006/0110714 A1* | 5/2006 | Symmes | G09B 7/00 | 434/167 |
| 2007/0003913 A1* | 1/2007 | Rosenberg | G09B 19/06 | 434/156 |
| 2007/0288240 A1* | 12/2007 | Huang | G10L 13/033 | 704/260 |
| 2009/0006097 A1* | 1/2009 | Etezadi | G10L 13/08 | 704/260 |
| 2009/0281808 A1* | 11/2009 | Nakamura | G10L 13/04 | 704/258 |
| 2010/0153115 A1* | 6/2010 | Klee | G10L 13/08 | 704/260 |
| 2010/0231752 A1* | 9/2010 | Lodge | G09B 21/001 | 348/231.4 |
| 2012/0065977 A1* | 3/2012 | Tepperman | G10L 13/08 | 704/258 |
| 2012/0164611 A1* | 6/2012 | O | G09B 19/06 | 434/167 |
| 2012/0226500 A1* | 9/2012 | Balasubramanian | G10L 13/033 | 704/260 |
| 2012/0276504 A1* | 11/2012 | Chen | G09B 5/067 | 434/157 |
| 2012/0329013 A1* | 12/2012 | Chibos | G09B 5/06 | 434/157 |
| 2013/0065205 A1* | 3/2013 | Park | G06T 13/40 | 434/157 |
| 2013/0132069 A1* | 5/2013 | Wouters | G10L 13/06 | 704/8 |
| 2015/0134338 A1* | 5/2015 | Jung | G09B 19/06 | 704/260 |
| 2016/0133155 A1* | 5/2016 | Lee | G09B 19/06 | 434/157 |
| 2016/0358596 A1* | 12/2016 | Singh | G06F 40/295 | |
| 2018/0165986 A1* | 6/2018 | Patel | G10L 13/00 | |
| 2018/0190269 A1* | 7/2018 | Lokeswarappa | G10L 13/00 | |
| 2018/0330715 A1* | 11/2018 | Lee | G10L 15/02 | |
| 2019/0103082 A1* | 4/2019 | Ogasawara | G10H 1/0008 | |

OTHER PUBLICATIONS

"International Search Report and Written Opinion Issued in PCT Application No. PCT/US2019/052810", dated Dec. 10, 2019, 11 Pages.

* cited by examiner

CONVERSION OF TEXT-TO-SPEECH PRONUNCIATION OUTPUTS TO HYPERARTICULATED VOWELS

RELATED APPLICATION

This application claims priority to U.S. Provisional Application Ser. No. 62/745,437 filed Oct. 14, 2018, entitled "CONVERSION OF TEXT-TO-SPEECH PRONUNCIATION OUTPUTS TO HYPERARTICULATED VOWELS," which is incorporated herein by reference in its entirety for all purposes.

BACKGROUND

Persons learning languages such as English and French, which have poor letter-to-sound mapping, often have a difficult time correctly pronouncing words in their new language. Persons with learning disabilities such as dyslexia also have a hard time reading, processing, and pronouncing words with poor letter-to-sound mapping. In the English and French languages, as well as some others, the poor letter-to-sound mapping is especially bad when it comes to vowels and their pronunciations. There are a number of rules and exceptions that can be applied to words and their corresponding vowels, which if memorized, can help with pronunciations. However, those rules can be challenging not only to memorize, but also to apply in practice, even for those that are well versed in a language.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for mapping hyperarticulated sounds to text units (e.g., vowels, phonemes, syllables). A plurality of textual units may be processed with a natural language processing engine. A sentence structure for the plurality of textual units may be identified based on the processing with the natural language processing engine, wherein the sentence structure comprises a plurality of words. The plurality of words may be processed with a text-to-speech engine and/or a letter-to-sound module of a text-to-speech engine. A text-to-speech output comprising a plurality of pronunciations may be identified, wherein each of the plurality of pronunciations corresponds to a phoneme of one of the plurality of words. Hyperarticulated vowel sounds may be mapped to each syllabic unit for each word, and a display element corresponding to each mapped hyperarticulated vowel sound may be caused to be displayed in association with its corresponding syllabic unit. In some examples, the display element may be interacted with via a graphical user interface, and a pronunciation corresponding to a noun represented by that display element may be caused to be audibly communicated.

BRIEF DESCRIPTION OF THE DRAWINGS

Non-limiting and non-exhaustive examples are described with reference to the following figures.

DETAILED DESCRIPTION

Figure 1:
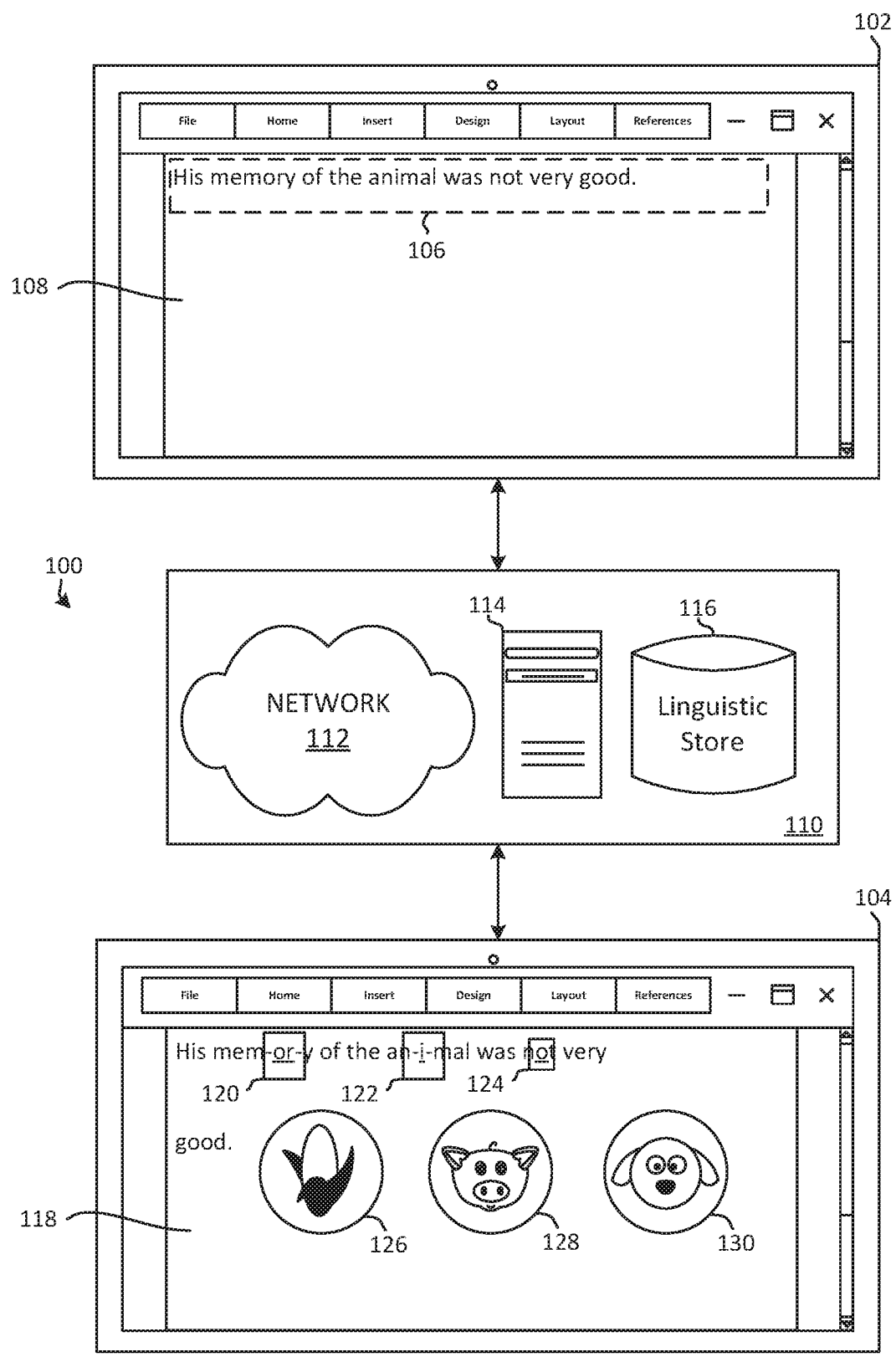
FIG. 1 is a schematic diagram illustrating an example distributed computing environment for mapping hyperarticulated sounds to text units and providing enhanced pronunciation tools.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

In addition to providing enhanced learning experiences for language learners and users with language disabilities, the systems, methods, and devices described herein provide technical advantages for improving user experience with a variety of software applications. For example, although text-to-speech engines can be helpful for users in providing pronunciations for some words and/or syllables, those text-to-speech engines fall short in that they are programmed to produce sounds for words that are useful in fluent speech rather than appropriate sounds for learning a language. Alternatively, the systems, methods, and devices described herein, utilize a natural language processing engine, a syllabification engine, a text-to-speech engine, a hyperarticulation rules engine, and in some scenarios a manually curated lexicon, to arrive at hyperarticulated sounds that are appropriate for new language learners and/or users with language disabilities, such that images corresponding to those hyperarticuated sounds may be displayed and/or audibly communicated in association with syllables and those syllables' corresponding vowels from processed text. The users may interact with those display elements to gain an increased understanding of a language thereby increasing the speed at which they can learn to pronounce words in a language and/or comprehend text that they are reading. In some cases, this may reduce processing load on computing devices for language learning applications due to the increased speed at which users gain an understanding of pronunciations for words in a language that those users are attempting to learn.

FIG. 1 is a schematic diagram illustrating an example distributed computing environment 100 for mapping hyperarticulated sounds to text units and providing enhanced pronunciation tools. Computing environment 100 includes computing device 102 and computing device 104, which may be the same or different computing devices, and network and processing sub-environment 100. Any of the computing devices shown in computing environment 100 may communicate with one another via a wired or wireless network, such as network 112 in network and processing sub-environment 100.

A productivity application is being executed on computing device 102, as illustrated by productivity application user interface 108 being displayed on computing device 102. In this example, the productivity application type being executed is a word processing application, although other productivity application types (e.g., presentation applications, email applications, scheduling applications, calendar applications, spreadsheet applications, reading applications, etc.) may utilize the enhanced pronunciation tools described herein. A sentence 106 is displayed on productivity application user interface 108. The sentence 106 is: "His memory of the animal was not very good."

According to examples, the productivity application may be executed all or in part on a local computing device, such as computing device 102. In other examples, the productivity application may be executed all or in part in the cloud, such as on server computing device 114 in network and processing sub-environment 114. Similarly, while the operations described herein for mapping hyperarticulated sounds to text units and providing enhanced pronunciation tools may be performed all or in part on a local computing device 102, they may alternatively be performed all or in part on cloud computing resources, such as server computing device 114 in network and processing sub-environment 110.

Text from computing device 102 may be sent to a linguistic service executed on one or more computing devices, such as server computing device 114. The linguistic service may perform one or more operations associated with mapping hyperarticulated sounds to text units and providing enhanced pronunciation tools. For example, the linguistic service may analyze text from one or more productivity and/or reading applications and provide helpful linguistic tools for users that are new to a language being analyzed and/or for users that have reading disabilities. In this example, sentence 106 "His memory of the animal was not very good." has been received by the linguistic service. The linguistic service may utilize one or more software engines for processing that text, including, for example: a natural language processing engine, a text-to-speech engine, a syllabification engine, a hyperarticulation rules engine and/or a language detection engine.

In some examples, the linguistic service may receive the text from sentence 106 and process it with a language detection engine to determine what language the text is in. In some examples, the language detection may analyze the frequency and/or sequence of letters in sentence 106. In other examples, an account associated with the productivity application containing sentence 106 and/or the productivity application itself, may automatically indicate to the linguistic service that the text is in a particular language. For example, a user associated with an account may indicate that her primary language is English, and the linguistic service may therefore default to analyzing text in an English form. Regardless, in the illustrated example here, the linguistic service makes the determination and/or receives an indication that the text in sentence 106 is English text.

The linguistic service may process the text from sentence 106 with a natural language processing engine. In some examples, the linguistic service may incorporate distinct natural language processing analytics engines for different languages. Thus, in this example, the linguistic service may provide the text from sentence 106 to an English natural language processing analytics engine. The English natural language processing analytics engine may perform operations on the text, such as identifying a sentence structure of the text, identifying individual words in the text, identifying parts of speech that individual words correspond to (e.g., nouns, verbs, etc.), and/or identifying the context of words and phrases in the text (e.g., homographs).

In some examples, the linguistic service may take the output from the natural language processing engine and provide it to a text-to-speech engine. In other examples, the linguistic service may bypass the natural language processing engine and send the text directly to the text-to-speech engine. In additional examples the linguistic service may take the output from the natural language processing engine and provide it to a syllabification engine prior to, or in parallel with, providing the output to the text-to-speech engine. The syllabification engine may utilize a lexicon and/or artificial intelligence mechanisms for identifying syllable breaks in the words included in the text (e.g., the syllable breaks in words included in sentence 106).

The text-to-speech engine may process the text in sentence 106 into text units (e.g., phonemes, syllables) that have text-to-speech pronunciations associated with them. That is, the text-to-speech engine may be utilized for identifying sounds that are to be made for correct pronunciations for the words and sentences encompassed by the processed text. The text-to-speech engine may analyze the text and/or the words and sentences in their respective context as received from the natural language processing engine, and associate symbolic phonetic representations with the corresponding phonemes and/or syllables for those text units. In some examples, there must be an agreement between the text-to-speech engine and the syllabification engine with regard to the location of syllable breaks in the words those respective engines have analyzed. If there is an agreement between the two engines, the text-to-speech engine may then associate symbolic phonetic representations with each syllable. However, if there is a disagreement between the two engines with regard to correct syllabification, the linguistic service may analyze a manually curated lexicon of exception words for which users, such as linguistic experts, have manually input the correct syllable breaks, and use those manually input breaks for associating symbolic phonetic representations with the corresponding syllables. In this example, the manually curated list resides in linguistic store 116, which the linguistic service executing on server computing device 114 may communicate with via network 112.

In some examples, the text-to-speech engine, when it processes a word after it has been contextualized in terms of its sentence, may output a symbolic phonetic representation for each phoneme and/or syllable in that word and/or an example word that includes a sound corresponding to that symbolic phonetic representation. In some examples, the linguistic service may associate the example word with the phoneme and/or syllable and allow a user to select the phoneme and/or syllable in the word to have the example audibly produced so that the user can be taught how to pronounce each phoneme and/or syllable in a word. In additional examples, the linguistic service may associate an image corresponding to each example word with the phoneme and/or syllable and allow a user to select the image to have the word/example corresponding to the image audibly produced so that the user can be taught how to pronounce each phoneme and/or syllable in a word and/or each vowel sound in each syllable.

One or more of the following set of symbolic phonetic representations (SYM), and their associated examples, may be output by the text-to-speech engine for a given word.

SYM: "AA"; Example: "father"
SYM: "AE"; Example: "cat"
SYM: "AH"; Example: "cut"
SYM: "AO"; Example: "dog"
SYM: "AW"; Example: "foul"
SYM: "AX"; Example: "ago"
SYM: "AY"; Example: "bite"
SYM: "B"; Example: "big"
SYM: "CH"; Example: "chin"
SYM: "D"; Example: "dig"
SYM: "DH"; Example: "then"
SYM: "EH"; Example: "pet"
SYM: "ER"; Example: "fur"
SYM: "EY"; Example: "ate"
SYM: "F"; Example: "fork"
SYM: "G"; Example: "gut"
SYM: "H"; Example: "help"
SYM: "IH"; Example: "fill"
SYM: "IY"; Example: "feel"
SYM: "JH"; Example: "joy"
SYM: "K"; Example: "cut"
SYM: "L"; Example: "lid"
SYM: "M"; Example: "mat"
SYM: "N"; Example: "no"
SYM: "NG"; Example: "sing"
SYM: "OW"; Example: "go"
SYM: "OY"; Example: "toy"
SYM: "P"; Example: "put"
SYM: "R"; Example: "red"
SYM: "S"; Example: "sit"
SYM: "SH"; Example: "she"
SYM: "T"; Example: "talk"
SYM: "TH"; Example: "thin"
SYM: "UH"; Example: "book"
SYM: "UW"; Example: "too"
SYM: "V"; Example: "vat"
SYM: "W"; Example: "with"
SYM: "Y"; Example: "yard"
SYM: "Z"; Example: "zap"
SYM: "ZH"; Example: "pleasure"

Text-to-speech engines generally output pronunciations of words that are appropriate for use in conversing and/or providing instructions via digital assistants and artificial intelligence services. However, those text-to-speech engines and digital assistants do not clearly pronounce certain vowel sounds because those vowel sounds are generally spoken in an unclear and/or non-hyperarticulated manner to mimic fluent everyday speech. The linguistic service described herein may identify appropriate hyperarticulated pronunciations for the vowel sounds that text-to-speech engines typically do not provide hyperarticulations for, as well as symbolic phonetic representations for indicating those hyperarticulated vowels to users. In some examples, a hyperarticulated rules engine may be utilized to identify these instances and/or to identify which sounds/pronunciations to replace those instances with.

The hyperarticulation rules engine may apply one or more of the following rules to words that it processes to identify vowel letters for pronunciation in a syllable. Within a syllable, count how many letters are in the set of letters: A, E, I, O, U. If there is exactly one letter from the set: A, E, I, O, U, then that is the vowel letter. If there is more than one letter from the set: A, E, I, O, U in a syllable, and those letters are not contiguous (e.g., silent e), then the vowel sound corresponds to the first letter in that set. If there is a cluster of more than one letter from the set of: A, E, I, O, U, then the clustered letters from that set are the vowel letters, which is true with or without a silent "e". If a syllable has no letters from the set of: A, E, I, O, U, then identify whether there is a "Y" in the syllable. If there is a "Y" in the syllable, then that is the vowel letter.

In converting the fluent vowel sounds from the text-to-speech engine to hyperarticulated vowels, the hyperarticulation rules engine may apply one or more of the following exception rules based on the word types being exceptions to normal text-to-speech rules.

If the vowel text-to-speech vowel output sound "AO" (dog) is before the sound R, change the sound to "OR" (corn). Otherwise, keep as "AO" (dog).

If the text-to-speech vowel output sound "AA" (heart) is not before the sound R, change the sound to "AO" (dog).

If the text-to-speech vowel output sound "IH" (pig) is spelled with the letter "e" and is in the final sound of the syllable, change the sound to "IY" (key).

If the text-to-speech vowel output sound "IH" (pig) is spelled with the letters "ea", change the sound to "IY" (key).

If the text-to-speech vowel sound "IH" is spelled with the letter "e" and is not the final sound of the syllable, change the sound to "EH" (bed). Otherwise, keep "IH" (pig) as "IH" (pig).

All "schwa" sounds may be modified by the hyperarticulation rules engine. What sound a schwa sound is changed to depends on both what sounds come before the schwa sound, after the schwa sound, and by what letter(s) the schwa sound is spelled with. If the schwa sound is followed by another sound in a syllable, that is more important than sounds that precede the schwa sound. The hyperarticulation rules engine may apply one or more of the following rules to "schwa" outputs from the text-to-speech engine, and if none of the following rules applies, then a final replace with "AH" (sun) may be applied.

If the schwa sound is applied to a "Y" in isolation, change the sound to the "key" vowel sound.

If the schwa sound is applied to "I" in isolation, change the sound to the "pig" vowel sound.

If the schwa sound is applied to any other vowel in isolation, change the sound to the "sun" vowel sound.

If the schwa sound corresponds to the vowel "O" followed by "R", change the sound to the "OR" sound in "corn".

If the schwa sound corresponds to the vowel "A" followed by "R", change the sound to the "AR" sound in "heart".

If the schwa sound corresponds to any vowel other than "A" followed by "R", change the sound to the "EAR" sound in "earth".

If the schwa sound is followed by "L", change the sound to "L" in "wolf".

If the schwa sound corresponds to the vowel "A" followed by a stop consonant (B, D, G, P, T, K), change the sound to the "A" sound in "ant".

If the schwa sound corresponds to the vowel "E" followed by a stop consonant (B, D, G, P, T, K), change the sound to the "E" in "bed".

If the schwa sound corresponds to the vowel "I" followed by a stop consonant (B, D, G, P, T, K), change the sound to the "I" sound in "pig".

If the schwa sound corresponds to any other vowel followed by a stop consonant (B, D, G, P, T, K), change the sound to the "U" sound in "sun".

If the schwa sound corresponds to the vowel "A" and is followed by a nasal sound (M, N, NG), change the sound to the "A" sound in "ant".

If the schwa sound corresponds to the vowel "E" and is followed by a nasal sound (M, N, NG), change the sound to the "E" in "bed".

If the schwa sound corresponds to the vowel "I" and is followed by a nasal sound (M, N, NG), change the sound to the "I" in "pig".

If the schwa sound corresponds to any other vowel and is followed by a nasal sound (M, N, NG), change the sound to the "U" in "sun".

If the schwa sound corresponds to the vowel "E" and is followed by a fricative (CH, DH, F, JH, SH, TH, V, Z, ZH), change the sound to "E" in "bed".

If the schwa sound corresponds to the vowel "I" and is followed by a fricative (CH, DH, F, JH, SH, TH, V, Z, ZH), change the sound to "I" in "pig".

If the schwa sound corresponds to any other vowel and is followed by a fricative (CH, DH, F, JH, SH, TH, V, Z, ZH), change the sound to "U" in "sun".

If the schwa sound corresponds to the vowel "E" and is preceded by a stop consonant (B, D, G, P, T, K), change the sound to "E" in "bed".

If the schwa sound corresponds to the vowel "I" and is preceded by a stop consonant (B, D, G, P, T, K), change the sound to "I" in "pig".

If the schwa sound corresponds to the vowel "O" and is preceded by a stop consonant (B, D, G, P, T, K), change the sound to "O" in "bone".

If the schwa sound corresponds to any other vowel and is preceded by a stop consonant (B, D, G, P, T, K), change the sound to "U" in "sun".

If a schwa sound does not correspond to a vowel, and the schwa sound is preceded by a nasal sound (M, N, NG), change the sound to "I" in "pig".

If a schwa sound corresponds to the vowel "E" and the schwa sound is preceded by a nasal sound (M, N, NG), change the sound to "E" in "bed".

If a schwa sound corresponds to the vowel "I" and the schwa sound is preceded by a nasal sound (M, N, NG), change the sound to "I" in "pig".

If the schwa sound corresponds to the vowel "O" and the schwa sound is preceded by a nasal sound (M, N, NG), change the sound to "O" in "bone".

If the schwa sound corresponds to any other vowel and the schwa sound is preceded by a nasal sound (M, N, NG), change the sound to "U" in "sun".

If the schwa sound corresponds to the vowel "I" and the schwa sound is preceded by a liquid sound (L, R), change the sound to "I" in "pig".

If the schwa sound corresponds to "Y" and the schwa sound is preceded by a liquid sound (L, R), change the sound to "Y" in "key".

If the schwa sound corresponds to the vowel "E" and the schwa sound is preceded by a liquid sound (L, R), change the sound to "E" in "bed".

If the schwa sound corresponds to any other vowel and the schwa sound is preceded by a liquid sound (L, R), change the sound to "U" in "sun".

If the schwa sound corresponds to the vowel "O" and the schwa sound is preceded by a fricative sound (CH, DH, F, JH, S, SH, TH, V, Z, ZH), change the sound to "O" in "bone".

If the schwa sound corresponds to the vowel "I" and the schwa sound is preceded by a fricative sound (CH, DH, F, JH, S, SH, TH, V, Z, ZH), change the sound to "I" in "pig".

If the schwa sound corresponds to any other vowel and the schwa sound is preceded by a fricative sound (CH, DH, F, JH, S, SH, TH, V, Z, ZH), change the sound to "U" in "sun".

If the schwa sound corresponds to the vowel "E" and the schwa sound is preceded by a glide sound (W, Y), change the sound to "E" in "bed".

If the schwa sound corresponds to the vowel "O" and the schwa sound is preceded by a glide sound (W, Y), change the sound to "O" in "Bone".

If the schwa sound corresponds to the vowel "U" and the schwa sound is preceded by a glide sound (W, Y), change the sound to "OO" in "moon".

If the schwa sound corresponds to any other vowel and the schwa sound is preceded by a glide sound (W, Y), change the sound to "U" in "sun".

In this example, the linguistic service and/or the hyperarticulation rules engine have identified three words in sentence 106 with vowels that should be flagged for hyperarticulation based on those words being exceptions to normal text-to-speech rules. For example, as illustrated on user interface 118, text unit 120 in the word "memory", text unit 122 in the word "animal", and text unit 124 in the word "not" have all been flagged by the linguistic service and/or the hyperarticulation rules engine for hyperarticulation.

In this example, the linguistic service may identify a word with a vowel sound that corresponds to the way that each of the text units 120, 122, and 124 should be pronounced for hyperarticulation purposes. The linguistic service may cause an image corresponding to those words to be displayed proximate to each corresponding text unit. Thus, in this example, corn image 126 is displayed in association with text unit 120, such that a user will know to hyperarticulate the "OR" in "memory" similar to the "OR" in "corn"; pig image 128 is displayed in association with text unit 122, such that a user will know to hyperarticulate the "I" in "animal" similar to the "I" in "pig"; and dog image 130 is displayed in association with text unit 124, such that a user will know to hyperarticulate the "O" in "not" similar to the "O" in "dog".

Other user interface mechanisms may be utilized for informing users to hyperarticulate vowels in certain manners for various words. For example, a user may hover or click on a word, vowel in a word, or text unit in a word (e.g., "memory" or "OR" in "memory"), and when that word, vowel, or text unit is thereby selected, an image corresponding to the vowel sound (e.g., an image of corn for "memory", an image of "pig" for "animal", an image of "dog" for "not") may then be caused to be surfaced on the user interface. In still other examples, a user may select an image and the word corresponding to that image may be caused to be audibly produced by the computing device displaying the image. Additionally, while a corn image 126, a pig image 128, and a dog image 130 are used for exemplary purposes, it should be understood that other words and their corresponding images may be utilized for purposes of hyperarticulating those same words, as long as the vowel sound in the word/image correspond to the hyperarticulation exception rules outlined above. Similarly, while these three examples are shown for illustrative purposes, it should be understood that words and images may be displayed for each of the exception rules described above, and that images corresponding to non-exception vowel sounds may also be displayed in association with each word (i.e., words that a text-to-speech engine may pronounce correctly and/or in a hyperarticulated manner may also have images displayed with them to teach users how to pronounce normal/fluent vowel sounds).

Figure 2:
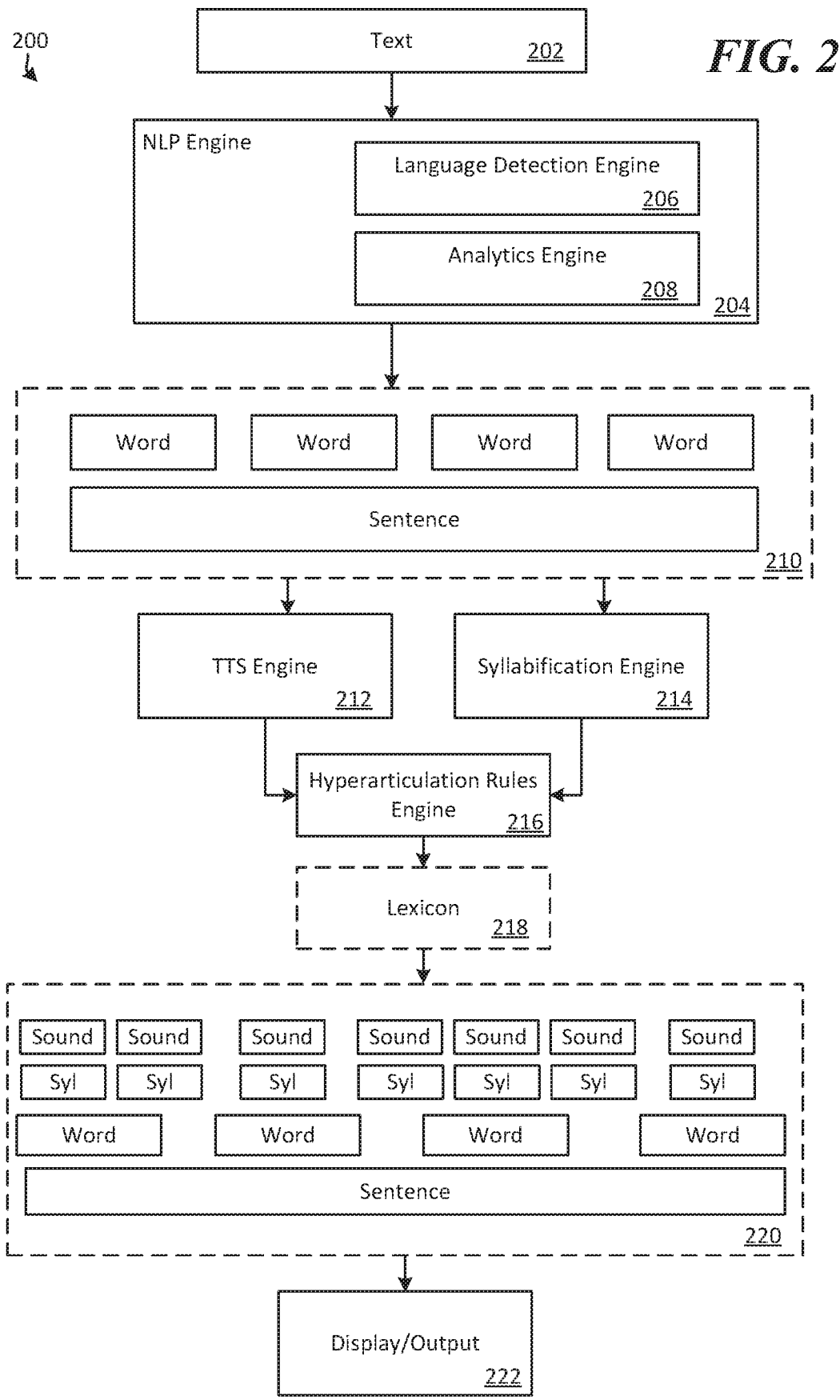
FIG. 2 illustrates a schematic diagram illustrating the processing of text by various language processing engines that are utilized to provide enhanced pronunciation tools.

FIG. 2 illustrates a schematic diagram 200 illustrating the processing of text by various language processing engines that are utilized to provide enhanced pronunciation tools. Schematic diagram 200 includes text 202, natural language processing engine 204 (which includes language detection engine 206 and analytics engine 208), natural language processing engine output 210 (which includes sentence structure and words), text-to-speech engine 212, syllabification engine 214, hyperarticulation rules engine 216, lexicon 218 (sometimes referred to herein as a linguistic table), rules output 220 (which includes sentence structure, words, syllables, and sounds), and display/output 222.

Text 202 from a software application (e.g., a word processing application, a presentation application, a spreadsheet application, a reading application, an email application, a calendar application, etc.) may be caused to be analyzed by a linguistic service for indicating hyperarticulated vowel sounds to users. In some examples, a user may manually indicate via a selection element in the software application that the user would like to provide text 202 to the linguistic service for processing. In other examples, the linguistic service may automatically process text 202. The linguistic service may comprise one or more of the engines illustrated in FIG. 2.

Text 202 is provided to natural language processing engine 204, and specifically, language detection engine 206 and analytics engine 208. Language detection engine 206 may make a first determination as to what language text 202 is in. In this manner, natural language processing engine 204 can identify a correct analytics engine to process text 202 with. For example, analytics engine 208 may comprise an English analytics engine if text 202 is determined to be English, and analytics engine 208 may comprise a French analytics engine if text 202 is determined to be French. Other text languages and associated analytics engines are contemplated. Analytics engine 208 may break text 202 into full sentences and/or words based on text 202's identified language and the linguistic rules associated therewith. For example, although periods may identify sentence breaks in some languages, those same periods may specify abbreviations in others (e.g., Mr., Mrs.). Additionally, based on the word and sentence structure identified by analytics engine 208, each word may be identified to a degree of certainty based on its use in a corresponding sentence. For example, a word in a sentence may be defined for a sentence based on its context despite the fact that it may have a plurality of meanings (e.g., "accent", "bat", "digest", "produce"). In this example, this is illustrated by natural language processing engine output 210.

Once natural language processing engine output 210, including sentences, words, and context from text 202, is identified and defined, natural language processing engine output 210 can be provided to text-to-speech engine 212 and syllabification engine 214. Text-to-speech engine 212 may process each word from text 202, and based on its context, identify phonemes and/or syllables for each of those words, and associate symbolic phonetic representations with the corresponding phonemes and/or syllables for those text units. The syllabification engine 214 may also receive natural language processing engine output 210 and its corresponding words based on their context in each sentence, and identify the syllable breaks in each of those received words.

In examples where the syllable breaks identified by the text-to-speech engine and the syllabification engine are the same, the words, syllables and their corresponding symbolic phonetic representations may be run through hyperarticulation rules engine 216 for identifying correct vowel pronunciations associated with each syllable in each word. The result of processing by hyperarticulation rules engine 216 is rules output 220, which includes sentence structure, words, syllables, and sounds, as well as correct hyperarticulated sounds for vowels that would otherwise be pronounced via their standard text-to-speech rules. Finally, the hyperarticulated vowel sounds for text 202 may be visually and/or audibly provided to users at display/output 222. For example, an image associated with the correct hyperarticulated sound for one or more vowels in text 202 may be caused to be displayed in association with each of those one or more vowels. In some examples, a user may be able to interact with those images and have the word corresponding to each image audibly produced.

In examples where the syllable breaks identified by the text-to speech engine and the syllabification engine are not the same for a given word, the linguistic service may analyze lexicon 218 comprised of manually curated words and their manually curated syllable breaks, and identify hyperarticulated sounds for the vowels in those syllables based on that manual curation. Those hyperarticulated vowel sounds for text 202 may then be visually and/or audibly provided to users at display/output 222 in a same or similar manner as described above.

Figure 3:
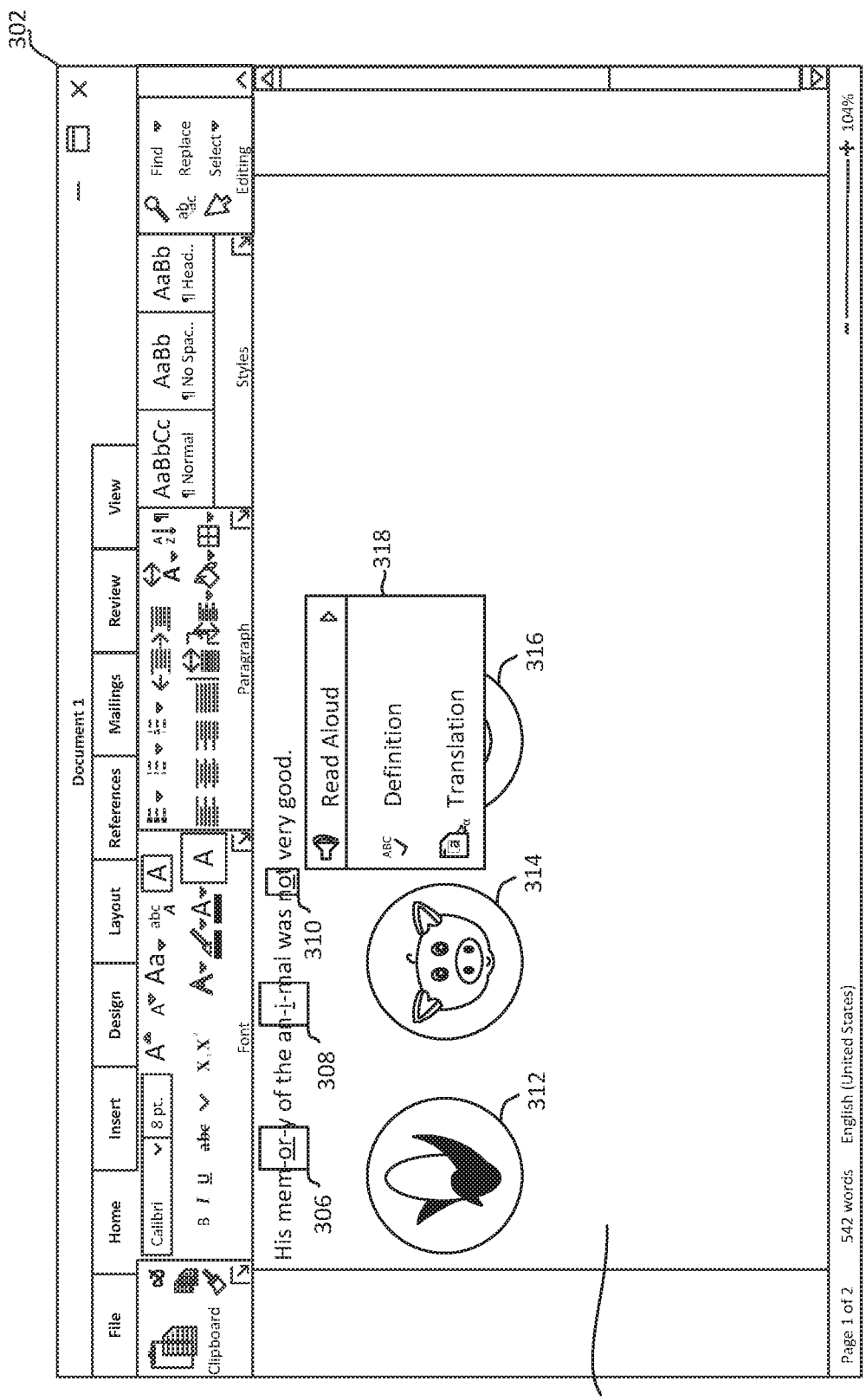
FIG. 3 illustrates an exemplary user interface of a productivity application demonstrating one example implementation of enhanced pronunciation tools described herein.

FIG. 3 illustrates an exemplary user interface 304 of a productivity application, executed on computing device 302, demonstrating one example implementation of enhanced pronunciation tools described herein. User interface 304 includes a sentence with three words that have hyperarticulation rules exceptions. Those words are "memory" (having exception text unit 306), "animal" (having exception text unit 308), and "not" (having exception text unit 310). Images corresponding to each of those words and their corresponding exception text units are displayed in association with those words, which may be utilized by users for determining how to pronounce the vowel sounds corresponding to those text units in a hyperarticulated manner. The images are: corn image 312 (corresponding to the "OR" in "memory), pig image 314 (corresponding to the "I" in "animal"), and dog image 316 (corresponding to the "O" in "not"). Dog image 316 has been covered in user interface 304 by pop-up window 318 with selectable options that a user may select for having additional information related to a word provided. For example, a user may select the word "animal" and/or exception text unit 308 in the word "animal" and a pop-up window such as pop-up window 318 may be caused to be displayed with selectable options for reading aloud either the word "animal" or the word corresponding to the way that the vowel sound in that word is to be hyperarticulated (i.e., "pig"). The pop-up window may contain additional information useful for users wishing to pronounce words correctly, such as a definition for a selected word and/or a translation of a selected word and/or a word corresponding to pronunciation for a selected portion of a word (e.g., a hyperarticulate vowel).

Figure 4:
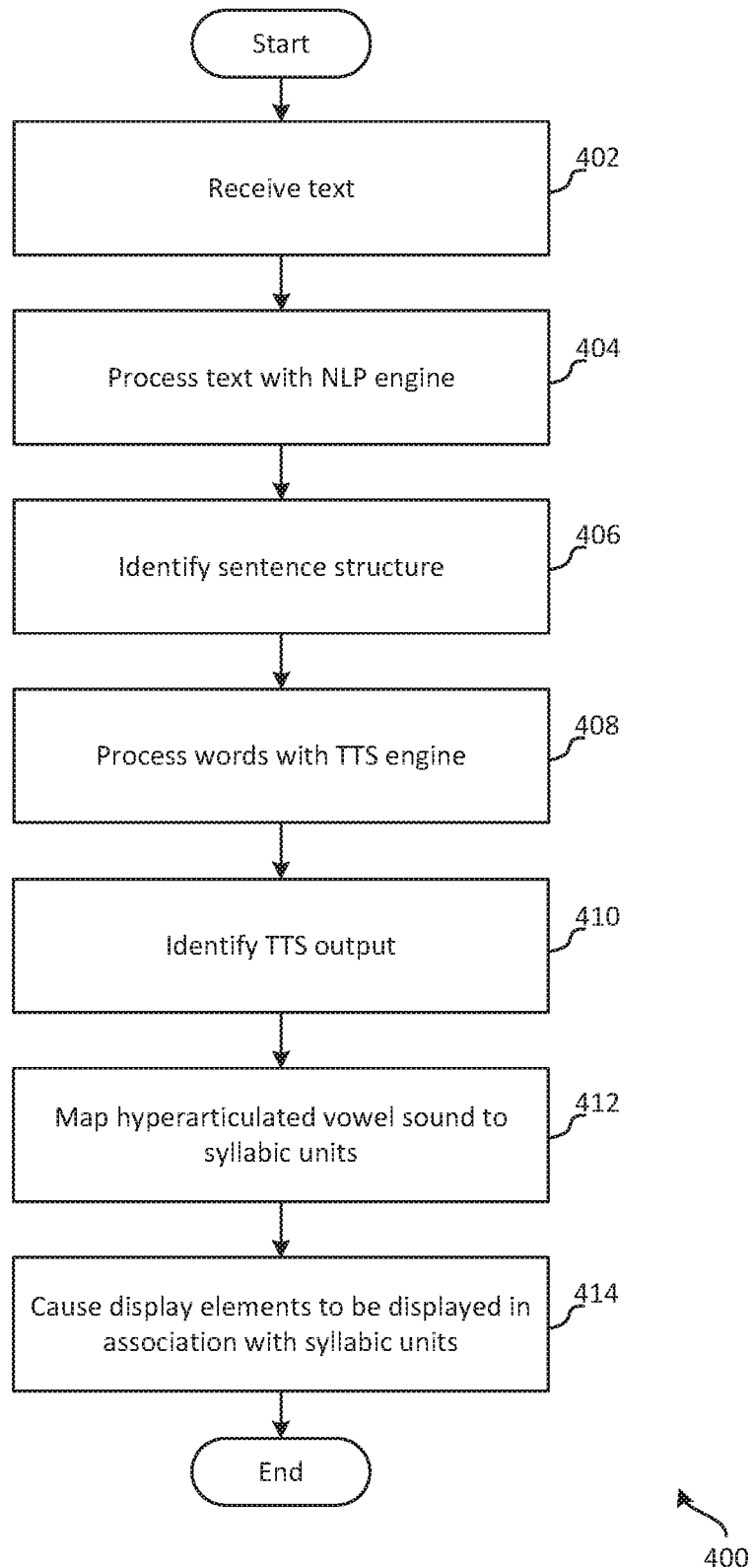
FIG. 4 is an exemplary method for mapping hyperarticulated sounds to text units.

FIG. 4 is an exemplary method 400 for mapping hyperarticulated sounds to text units. The method 400 begins at a start operation and flow continues to operation 402.

At operation 402 text is received by a linguistic service. The text may comprise one or more sentences and/or sentence fragments.

From operation 402 flow continues to operation 404 where the received text is processed by a natural language processing engine. The natural language processing engine may include a language detection engine and an analytics engine for each of a plurality of languages. The language detection engine may identify a language that text is composed in. The natural language processing engine may then select an appropriate analytics engine for processing the text with (e.g., an English language analytics engine, a French language analytics engine).

From operation 404 flow continues to operation 406 where a sentence structure for each sentence of the analyzed text is identified. The sentence structure comprises a plurality of words that are contextualized based on their use in each sentence (e.g., words and/or word definitions may be identified based on word and/or phrase context in a sentence). The sentence structure may also comprise sentence breaks in the text (e.g., although a period may typically mean there is a sentence end, that is not always the case).

From operation 406 flow continues to operation 408 where each of the words are processed with a text-to-speech engine. In some examples, the processing of the words by the text-to-speech engine may comprise processing with a letter-to-sound module. The processing by the text-to-speech engine may identify text units (e.g., phonemes, syllables) that have text-to-speech pronunciations associated with them. That is, the text-to-speech engine may be utilized for identifying sounds that are made for correct pronunciations for each word in a sentence based on its contextualization as provided by the natural language processing engine.

From operation 408 flow continues to operation 410 where a text-to-speech output is identified. The text-to-speech output may comprise a plurality of phonemes for each word and/or syllable and symbolic phonetic representations for each phoneme and/or syllable.

From operation 410 flow continues to operation 412 where hyperarticuled vowel sounds are mapped to each syllabic unit of each word. In some examples, a rules engine may be utilized for mapping hyperarticulated vowel sounds to phoneme's and/or syllables for which a text-to-speech engine would typically not hyperarticulate (e.g., schwa sounds).

From operation 412 flow continues to operation 414 where teaching elements corresponding to the hyperarticulated vowel sounds are caused to be surfaced. In some examples, the teaching elements may correspond to images for words that have pronunciations in them corresponding to the hyperarticulated vowel sounds. In other examples, the teaching elements may correspond to an audible cue for the hyperarticulated vowel sounds. In still other examples, the teaching elements may have definitions and/or translations for words associated with the hyperarticulated vowel sounds.

From operation 414 flow continues to an end operation, and the method 400 ends.

Figure 5:
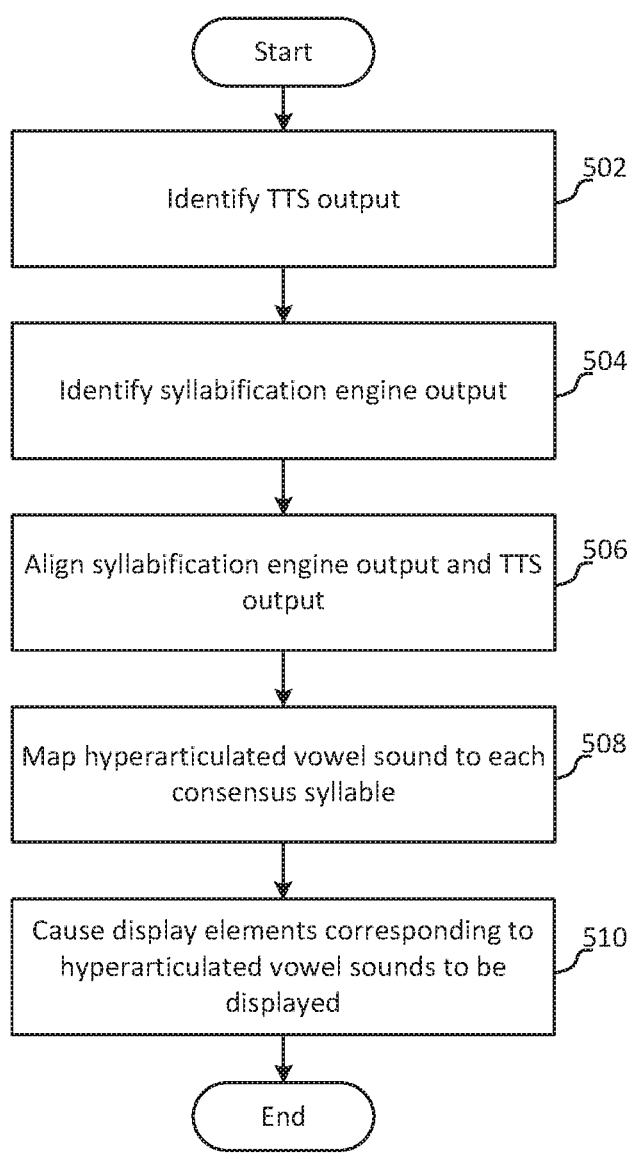
FIG. 5 is another exemplary method for mapping hyperarticulated sounds to text units.

FIG. 5 is another exemplary method 500 for mapping hyperarticulated sounds to text units. The method 500 begins at a start operation and flow continues to operation 502.

At operation 502 a text-to-speech output is identified for an input set of text. The text-to-speech output may comprise a plurality of phonemes for each word and/or syllable from the input set of text.

From operation 502 flow continues to operation 504 where a syllabification engine output is identified. The syllabification engine output is an identification of each syllable break in words that were provided to the syllabification engine. The syllabification engine may utilize a lexicon and/or artificial intelligence in identifying the syllable breaks in each word.

From operation 504 flow continues to operation 506 where the output from the text-to-speech engine and syllabification engine are aligned. In some examples, the phonemes for a word as output by the text-to-speech engine may not correspond to the syllable breaks identified/output by the syllabification engine. In such examples, a manually curated lexicon of proper syllable breaks may be utilized for identifying appropriate word breaks for mapping sounds to text units. For example, a text-to-speech engine may identify the phonemes "mem-or-y" for the word "memory", and a syllabification engine may identify the syllables "mem-o-ry" for the word memory. In such an example, the linguistic service may identify the word memory in a manually curated lexicon and resolve the discrepancy for pronunciation of that word based on the information in the lexicon.

From operation 506 flow continues to operation 508 where a hyperarticulated vowel sound is mapped to each consensus syllable in each word. In some examples, the hyperarticulated vowel sound may be mapped to each consensus syllable in each word based on one or more hyperarticulation rules and/or hyperarticulation exception rules as described herein. In other examples, the hyperarticulated vowel sound may be mapped to each consensus syllable based on hyperarticulation rules included in the manually curated lexicon (e.g., the manually curated lexicon may have proper hyperarticulations for each word included therein).

From operation 508 flow continues to operation 510 where display elements corresponding to the hyperarticulated vowel sounds are caused to be displayed. The display elements may be images of nouns that have vowel sounds that are the same as the hyperarticulated vowel sounds that a user should make for a corresponding syllable. In some examples, the images may be selectable for causing the word or hyperarticulated vowel sound to be audibly communicated by the computing device on which the image is displayed.

From operation 510 flow continues to an end operation and the method 500 ends.

Figure 6:
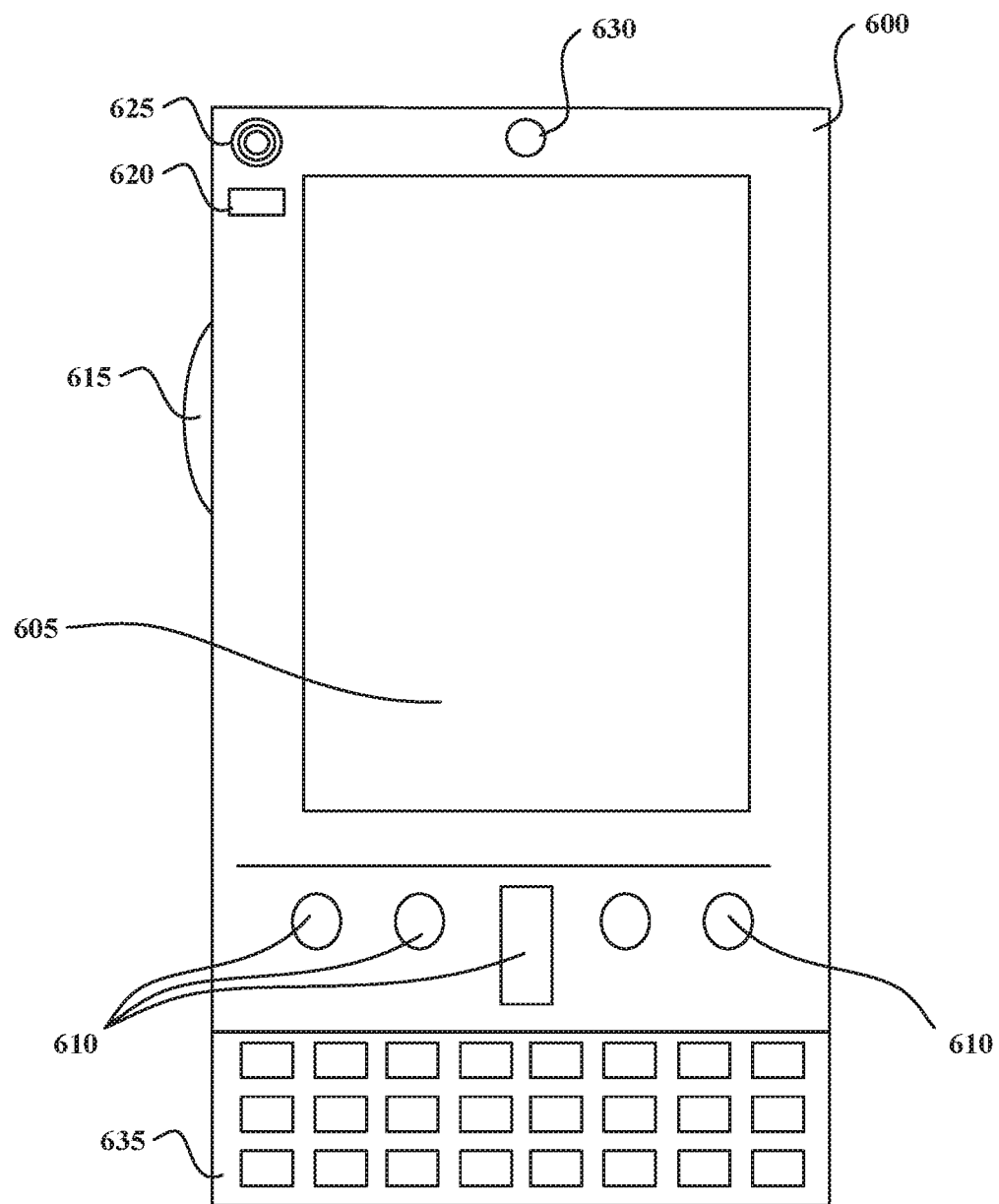
FIGS. 6 and 7 are simplified diagrams of a mobile computing device with which aspects of the disclosure may be practiced.
Figure 7:
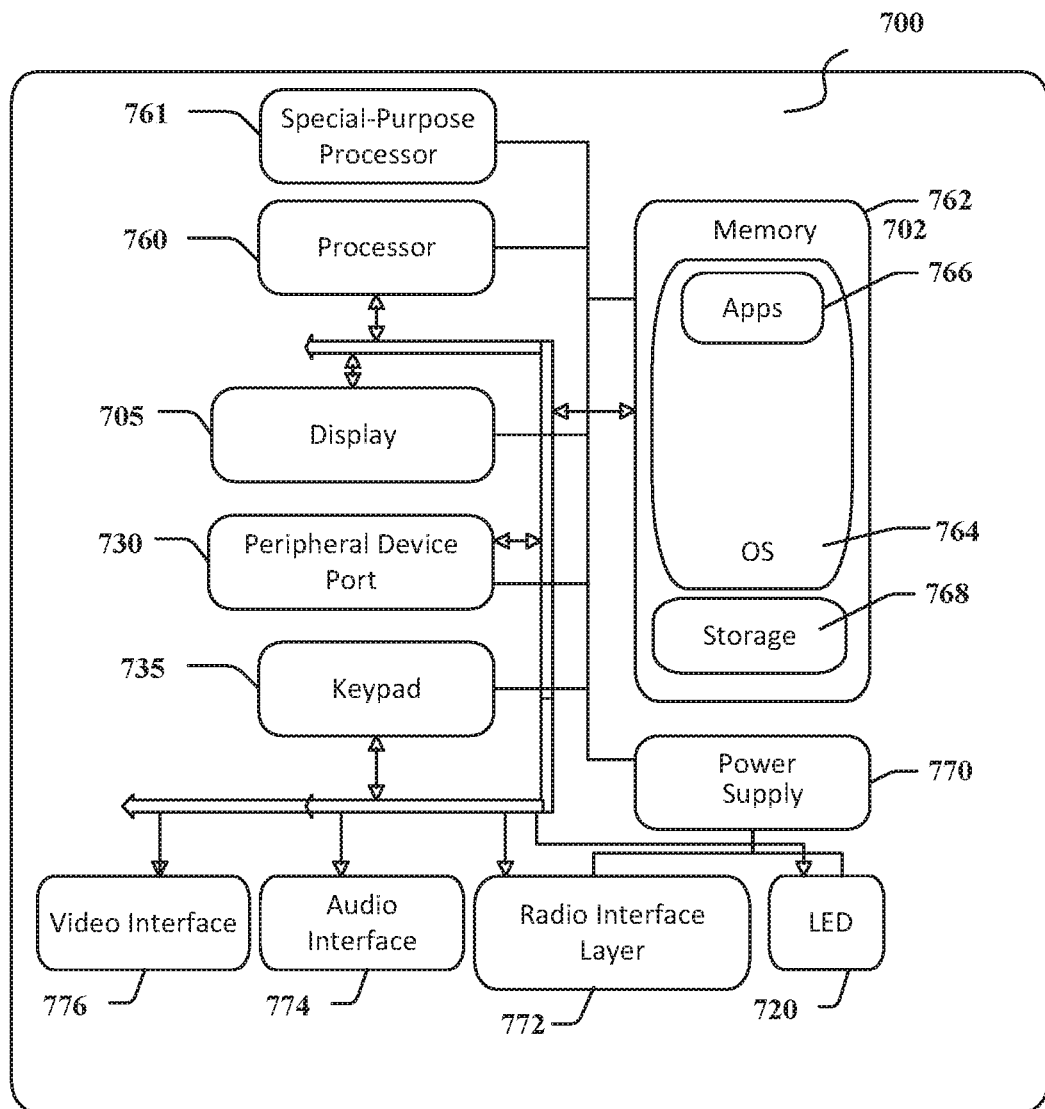

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
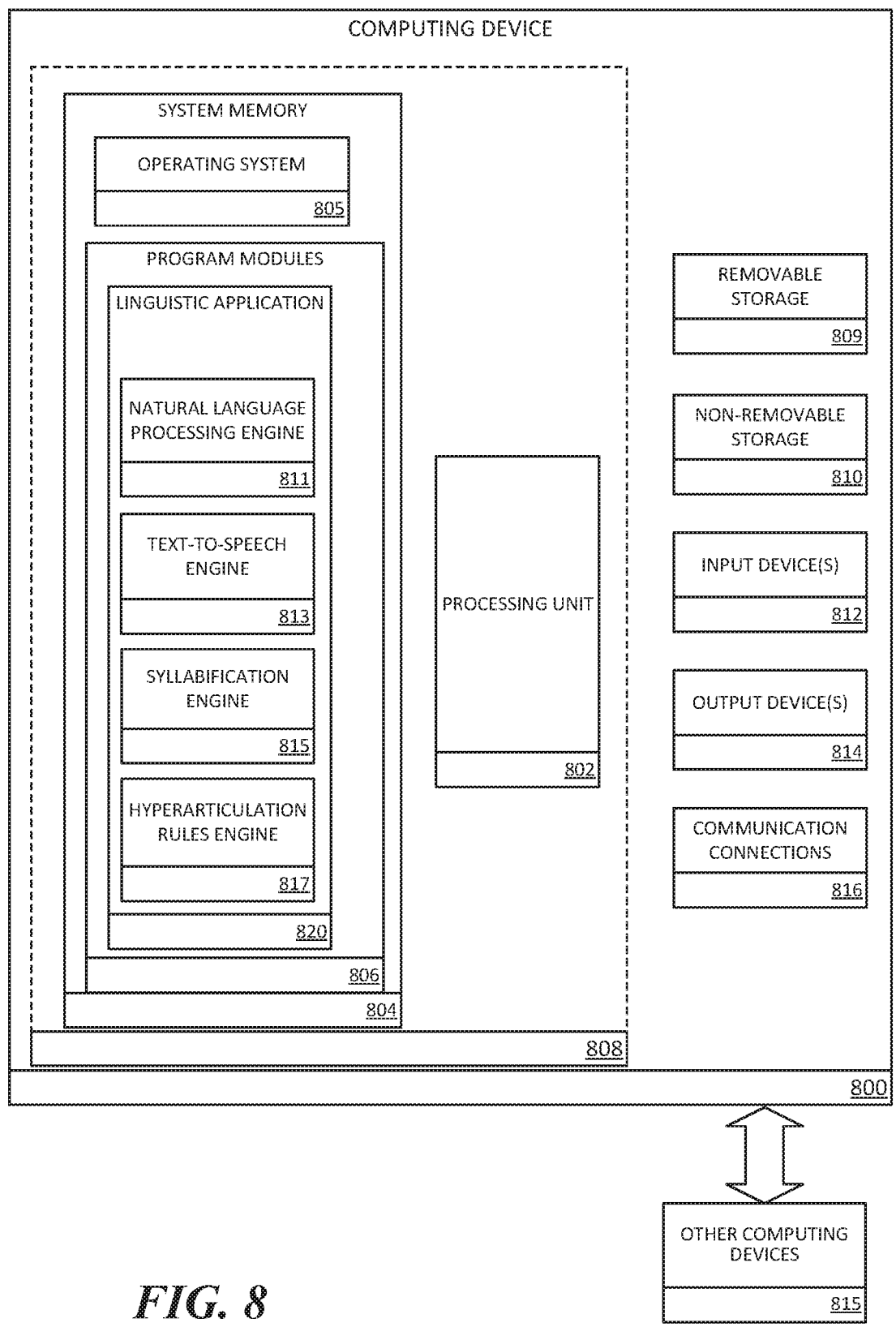
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for mapping hyperarticulated vowel sounds to text units. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more linguistic, text-to-speech, and/or natural language processing programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., linguistic application 820) may perform processes including, but not limited to, the aspects, as described herein. According to examples, the linguistic application and/or linguistic service may include natural language processing engine 811, text-to-speech engine 813, syllabification engine 815, and/or hyperarticulation rules engine 817.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
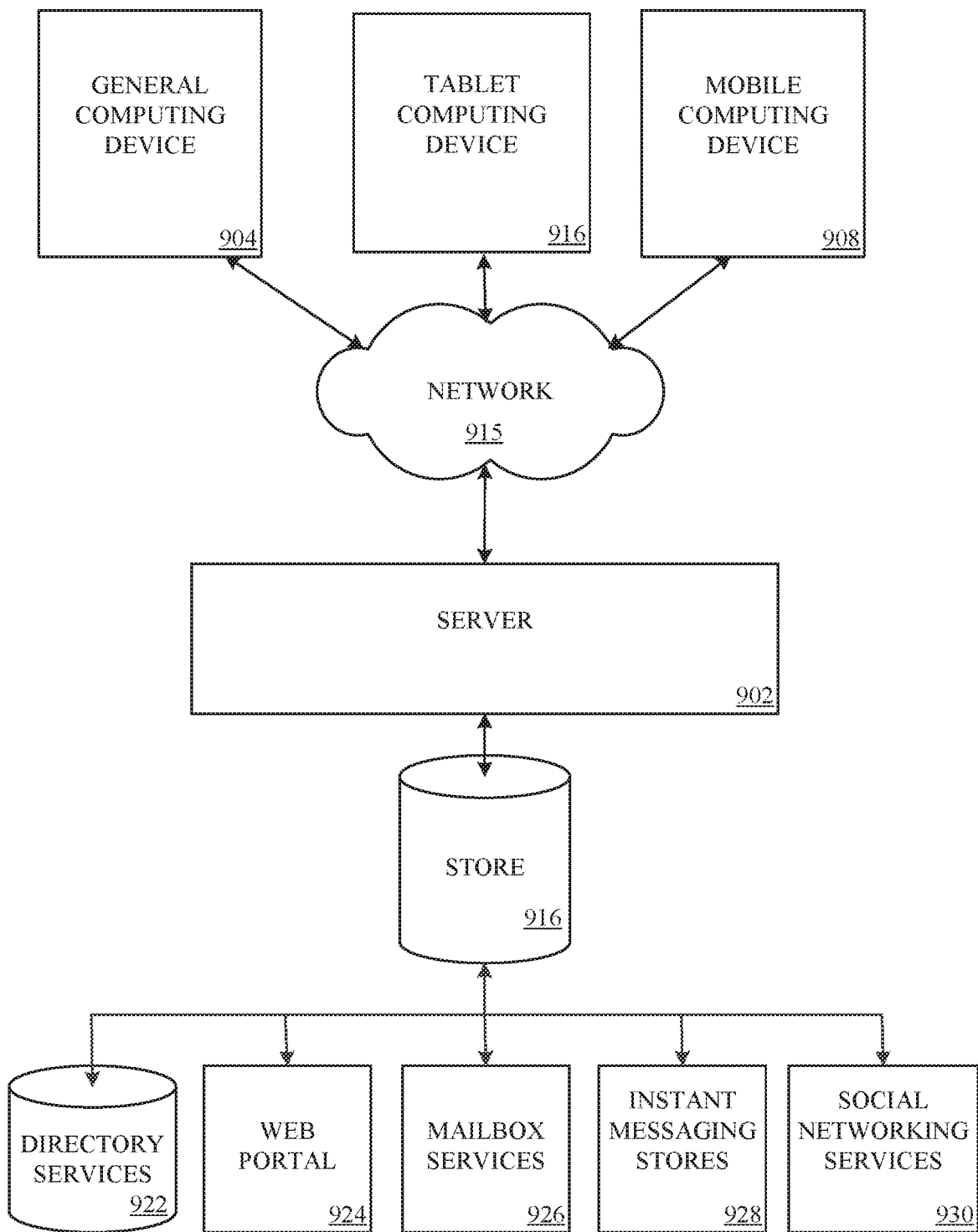
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for mapping hyperarticulated sounds to text units, the method comprising:
   receiving a plurality of textual units;
   processing the plurality of textual units with a natural language processing engine;
   identifying, based on the processing with the natural language processing engine, a sentence structure for the plurality of textual units, wherein the sentence structure comprises a plurality of words;
   processing the plurality of words with a text-to-speech engine;
   identifying, based on the processing with the text-to-speech engine, a text-to-speech output comprising a plurality of pronunciations, wherein each of plurality of pronunciations corresponds to a syllabic unit of one of the plurality of words;
   identifying, utilizing a syllabification engine, a syllabification engine output comprising at least one syllable for each of the plurality of words;
   aligning, for each of the plurality of words, the syllabification engine output and the text-to-speech output to identify a consensus set of syllables;
   mapping a hyperarticulated vowel sound to each of the consensus set of syllables; and
   displaying, in the plurality of textual units, a display element corresponding to each mapped hyperarticulated vowel sound in association with its corresponding syllable of the consensus set of syllables.

2. The method of claim 1, further comprising:
   processing the plurality of words with a language detection engine; and
   identifying, based on the processing with the language detection engine, a language associated with the plurality of words.

3. The method of claim 1, wherein aligning the syllabification engine output and the text-to-speech output to identify a consensus set of syllables comprises:
   determining, for each of the plurality of words, that there is a syllabic unit from the text-to-speech output that has a corresponding syllable from the syllabification engine.

4. The method of claim 3, further comprising:
   determining that the syllabification engine output and the text-to-speech output cannot be aligned for at least one of the plurality of words; and
   identifying correct syllabification for the at least one word from a manually curated syllabification table.

5. The method of claim 1, wherein each display element displayed in the plurality of textual units comprises an image of an object with a name having a vowel sound in it corresponding to an associated hyperarticulated vowel sound.

6. The method of claim 5, wherein each name for each object is a monosyllabic name.

7. The method of claim 1, wherein the syllabification engine utilizes a lexicon and artificial intelligence to identify the syllabification engine output.

8. A system for mapping hyperarticulated sounds to text units, comprising:
   a memory for storing executable program code; and
   one or more processors, functionally coupled to the memory, the one or more processors being responsive to computer-executable instructions contained in the program code and operative to:
   receive a plurality of textual units;
   process the plurality of textual units with a natural language processing engine;
   identify, based on the processing with the natural language processing engine, a sentence structure for the plurality of textual units, wherein the sentence structure comprises a plurality of words;
   process the plurality of words with a text-to-speech engine;
   identify, based on the processing with the text-to-speech engine, a text-to-speech output comprising a plurality of pronunciations, wherein each of the plurality of pronunciations corresponds to a syllabic unit of one of the plurality of words;
   identify, utilizing a syllabification engine, a syllabification engine output comprising at least one syllable for each of the plurality of words;
   align, for each of the plurality of words, the syllabification engine output and the text-to-speech output to identify a consensus set of syllables;
   map a hyperarticulated vowel sound to each of the consensus set of syllables; and
   display, in the plurality of textual units, a display element corresponding to each mapped hyperarticulated vowel sound in association with its corresponding syllable of the consensus set of syllables.

9. The system of claim 8, wherein in aligning the syllabification engine output and the text-to-speech output to identify a consensus set of syllables, the one or more processors are further responsive to the computer-executable instructions contained in the program code and operative to:
   determine, for each of the plurality of words, that there is a syllabic unit from the text-to-speech output that has a corresponding syllable from the syllabification engine.

10. The system of claim 9, wherein the one or more processors are further responsive to the computer-executable instructions contained in the program code and operative to:

determine that the syllabification engine output and the text-to-speech output cannot be aligned for at least one of the plurality of words; and identify correct syllabification for the at least one word from a manually curated syllabification table.

11. The system of claim 8, wherein each display element displayed in the plurality of textual units comprises an image of an object with a monosyllabic name having a vowel sound in it corresponding to a hyperarticulated vowel sound for a syllable in a word that the display element is displayed in association with.

12. The system of claim 8, wherein the syllabification engine utilizes a lexicon and artificial intelligence to identify the syllabification engine output.

13. A computer-readable storage device comprising executable instructions that, when executed by one or more processors, assists with mapping hyperarticulated sounds to text units, the computer-readable storage device including instructions executable by the one or more processors for:

receiving a plurality of textual units;

processing the plurality of textual units with a natural language processing engine;

identifying, based on the processing with the natural language processing engine, a sentence structure for the plurality of textual units, wherein the sentence structure comprises a plurality of words;

processing the plurality of words with a text-to-speech engine;

identifying, based on the processing with the text-to-speech engine, a text-to-speech output comprising a plurality of pronunciations, wherein each of plurality of pronunciations corresponds to a syllabic unit of one of the plurality of words;

identifying, utilizing a syllabification engine, a syllabification engine output comprising at least one syllable for each of the plurality of words;

aligning, for each of the plurality of words, the syllabification engine output and the text-to-speech output to identify a consensus set of syllables;

mapping a hyperarticulated vowel sound to each of the consensus set of syllables; and displaying, in the plurality of textual units, a display element corresponding to each mapped hyperarticulated vowel sound in association with its corresponding syllable of the consensus set of syllables.

14. The computer-readable storage device of claim 13, wherein in aligning the syllabification engine output and the text-to-speech output to identify a consensus set of syllables, the instructions are further executable by the one or more processors for:

determining, for each of the plurality of words, that there is a syllabic unit from the text-to-speech output that has a corresponding syllable from the syllabification engine.

15. The computer-readable storage device of claim 14, wherein the instructions are further executable by the one or more processors for:

determining that the syllabification engine output and the text-to-speech output cannot be aligned for at least one of the plurality of words; and identifying correct syllabification for the at least one word from a manually curated syllabification table.

16. The computer-readable storage device of claim 13, wherein the syllabification engine utilizes a lexicon and artificial intelligence to identify the syllabification engine output.

17. The computer-readable storage device of claim 13, wherein each display element displayed in the plurality of textual units comprises an image of an object with a name having a vowel sound in it corresponding to an associated hyperarticulated vowel sound.

18. The computer-readable storage device of claim 13, wherein each name for each object is a monosyllabic name.

\* \* \* \* \*